United States Patent
Blachon

(10) Patent No.: US 8,337,087 B2
(45) Date of Patent: Dec. 25, 2012

(54) MECHANICAL JOINT ASSEMBLY AND A METHOD OF ASSEMBLING SUCH AN ASSEMBLY

(75) Inventor: Yvan Blachon, Ponsas (FR)

(73) Assignee: SKF Aerospace, Saint-Vallier-sur-Rhone (FR)

( * ) Notice: Subject to any disclaimer, the term of this patent is extended or adjusted under 35 U.S.C. 154(b) by 85 days.

(21) Appl. No.: 12/813,802

(22) Filed: Jun. 11, 2010

(65) Prior Publication Data

US 2011/0023283 A1    Feb. 3, 2011

(30) Foreign Application Priority Data

Jun. 12, 2009   (FR) ..................................... 09 53945

(51) Int. Cl.
*F16C 23/04* (2006.01)

(52) U.S. Cl. ....................................... 384/208; 384/192

(58) Field of Classification Search .................. 384/192, 384/205, 206–212; 403/60, 78, 164, 165, 403/52, 70, 80, 119; 464/102, 104, 105, 464/106

See application file for complete search history.

(56) References Cited

U.S. PATENT DOCUMENTS

| | | | | |
|---|---|---|---|---|
| 1,311,679 A * | 7/1919 | Chalifoux | ...................... | 464/106 |
| 3,213,719 A * | 10/1965 | Kloack | ............................ | 81/436 |
| 3,214,942 A * | 11/1965 | Hill | ................................ | 464/102 |
| 3,371,398 A | 3/1968 | Patterson et al. | | |
| 4,055,369 A * | 10/1977 | Lynn et al. | ..................... | 384/477 |
| 4,185,837 A * | 1/1980 | Greene | .......................... | 277/400 |
| 4,411,545 A * | 10/1983 | Roberge | .......................... | 403/12 |
| 4,480,842 A * | 11/1984 | Mahyera et al. | .............. | 277/329 |
| 4,593,917 A | 6/1986 | Ferrari Aggradi et al. | | |
| 4,637,786 A * | 1/1987 | Matoba et al. | ............... | 418/55.3 |
| 5,033,872 A | 7/1991 | Ueno | | |
| 5,265,965 A * | 11/1993 | Harris et al. | .................. | 384/208 |
| 5,407,508 A * | 4/1995 | Harris et al. | .................. | 156/173 |
| 5,413,036 A * | 5/1995 | Schiel | ........................... | 100/168 |
| 5,704,773 A * | 1/1998 | Higashiyama | ............... | 418/55.3 |
| 5,743,658 A | 4/1998 | Vollmer et al. | | |
| 6,520,682 B2 * | 2/2003 | Kletzli et al. | ................. | 384/210 |
| 7,223,019 B2 * | 5/2007 | Hoppe | .......................... | 384/192 |
| 7,568,841 B2 * | 8/2009 | Wood et al. | ................... | 384/209 |
| 7,648,282 B2 * | 1/2010 | Shore et al. | ................... | 384/211 |
| 7,726,661 B2 * | 6/2010 | Orlowski et al. | ............. | 277/412 |
| 2004/0120755 A1 * | 6/2004 | Butler, III | ........................ | 403/52 |
| 2008/0247690 A1 * | 10/2008 | James et al. | .................. | 384/206 |
| 2011/0064343 A1 * | 3/2011 | Larrochelle et al. | .......... | 384/206 |

FOREIGN PATENT DOCUMENTS

| | | |
|---|---|---|
| DE | 297 03 146 U1 | 4/1997 |
| EP | 2039 949 A | 3/2009 |
| JP | 56 101418 A | 8/1981 |

* cited by examiner

*Primary Examiner* — Daniel P. Stodola
*Assistant Examiner* — Matthew R McMahon
(74) *Attorney, Agent, or Firm* — Dowell & Dowell, PC

(57) ABSTRACT

A joint assembly includes an inner ring, an intermediate member housing the inner ring about a joint axis and, an outer body retaining the intermediate member. The intermediate member defines two first surfaces formed by cylindrical portions having the same first axis of revolution which intersects the joint axis. The outer body defines two surfaces formed by cylindrical portions having the same second axis of revolution. When the assembly is in an assembled state, the first axis of revolution coincides with the second axis of revolution and the first and second surfaces cooperate to enable the intermediate member to rotate relative to the outer body about the first axis of revolution but prevent the intermediate member from moving parallel to the joint axis or parallel to an axis orthogonal to the joint axis and to the second axis of revolution.

17 Claims, 4 Drawing Sheets

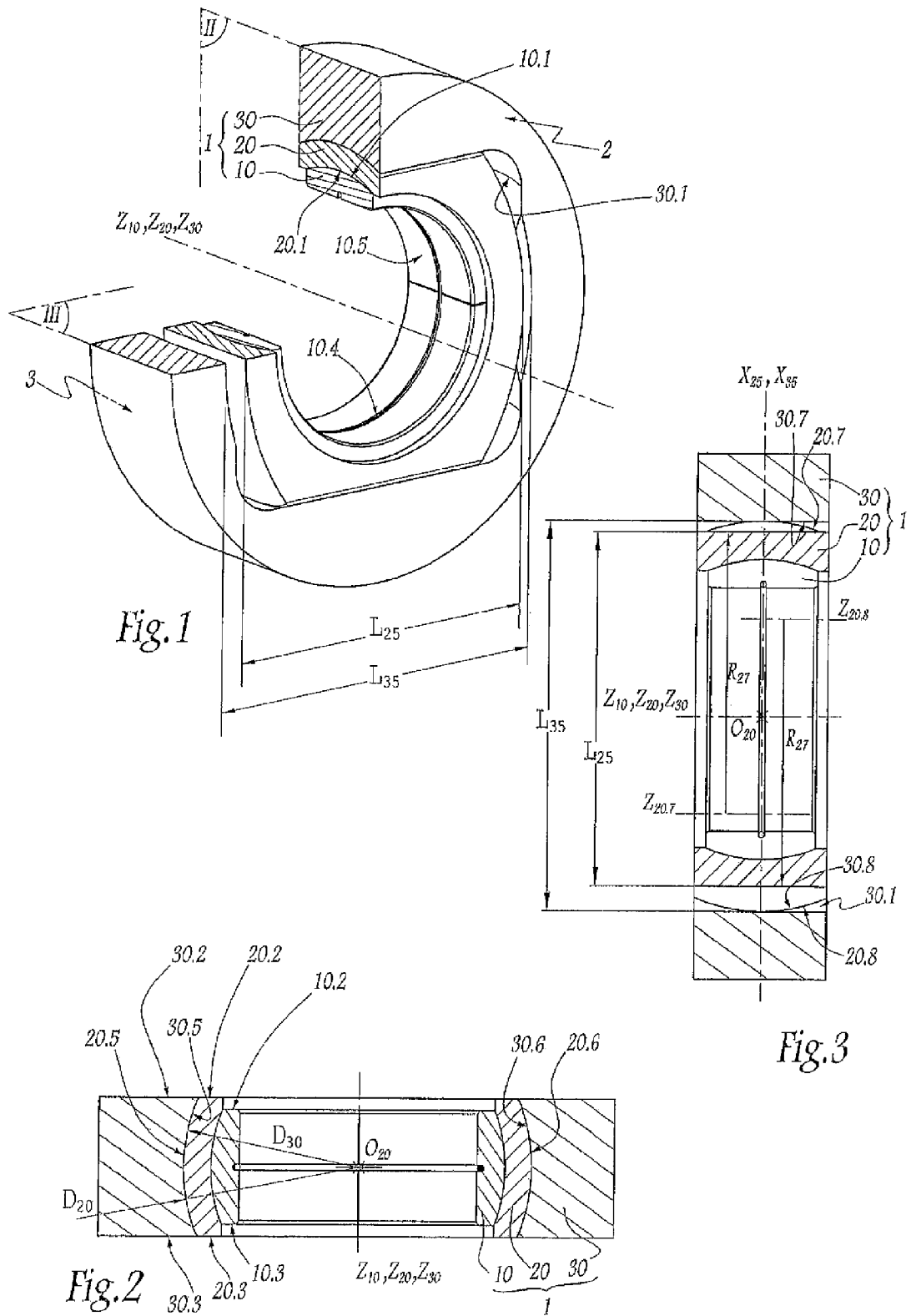

MECHANICAL JOINT ASSEMBLY AND A METHOD OF ASSEMBLING SUCH AN ASSEMBLY

BACKGROUND OF THE INVENTION

1. Field of the Invention

The present invention relates to a mechanical joint assembly, in particular a swivel assembly. Furthermore, the present invention relates to a method of assembling such an assembly. In the aviation industry, it is known to use a mechanical joint assembly for preventing two members, such as a rod and a structural part, from moving in relative translation, while nevertheless allowing those members to move relative to each other in rotation. A mechanical joint assembly serves in particular to compensate locally for the deformation and/or movement of an aircraft in operation.

2. Brief Description of the Related Art

A prior art mechanical joint assembly, in particular a swivel assembly, generally comprises an inner ring such as a ball core in which a shaft is mounted, an intermediate member defining a housing in which the ball core swivels, and an outer body defining a chamber for retaining the intermediate member. The chamber is a cavity that is configured to receive the intermediate member. In addition, the chamber is configured to allow movement in translation along a direction that is orthogonal to the axis of the joint. This movement gives a shaft mounted in the swivel assembly a degree of freedom in addition to those authorized by the swivel connection. In order to allow this movement, the chamber of the prior art mechanical joint assembly has two surfaces that are plane and parallel and that extend on either side of the intermediate member. The intermediate member presents two surfaces that are plane and complementary to the plane surfaces of the chamber, thereby allowing the intermediate member to move in translation relative to the outer body.

Nevertheless, the plane bearing connections formed between these respective plane surfaces present relatively limited capacity to accommodate contact. The swivel assembly must present little thickness and therefore plane surfaces that are relatively limited. In addition, with machining of ordinary quality, the respective plane surfaces of the outer body and of the intermediate member give rise to plane bearing connections that are not perfect, since these planes come into contact only along two lines. That is why contact pressures between the outer body and the intermediate member are relatively high, thereby reducing the lifetime of the swivel assembly. In addition, such plane bearing connections present relatively limited capacity to retain lubricant. In addition, such plane bearing connections do not prevent the intermediate member from moving in translation relative to the outer body along the axis of the joint, such that a swivel assembly of the prior art also needs to include a blocking component to retain the intermediate member in the chamber along the axis of the joint. Such a blocking member increases overall size, cost, and difficulty of assembling such a swivel assembly.

SUMMARY OF THE INVENTION

A particular object of the present invention is to remedy those drawbacks by proposing a compact swivel assembly that has a long lifetime and that is relatively simple to assemble.

To this end, the present invention provides a mechanical joint assembly, in particular a swivel assembly, comprising:

an inner ring such as a ball core, having an outer joint surface substantially in the shape of a truncated sphere, an intermediate member having a bearing inside surface that is substantially in the shape of a truncated sphere and complementary to the joint outside surface so as to receive the inner ring, the axis of revolution of the bearing inside surface defining a joint axis; and an outer body defining a chamber for retaining the intermediate member;

wherein the intermediate member defines two first surfaces formed by cylindrical portions, the first surfaces having a common first axis of revolution which intersects the joint axis;

wherein the outer body defines two second surfaces formed by cylindrical portions, the second surfaces having the same second axis of revolution; and wherein each first surface is configured to co-operate respectively with one of the second surfaces in such a manner that when the intermediate member is mounted in the chamber, the first axis of revolution coincides with the second axis of revolution and the first surfaces and the second surfaces enable the intermediate member to rotate relative to the outer body about the first axis of revolution but prevent the intermediate member from moving parallel to the joint axis or parallel to an axis orthogonal to the joint axis and to the second axis of revolution.

According to characteristics of the present invention that are advantageous but optional, whether taken in isolation or in any technically feasible combination:

the first surfaces are symmetrical about a center of the intermediate member, which is situated at the intersection between the joint axis and the first axis of revolution;

the first surfaces are formed by portions of the same first circular cylinder, and the second surfaces are formed by portions of the same second circular cylinder, the diameter of the circular base of the first cylinder being substantially equal to the diameter of the circular base of the second cylinder;

the diameter of the circular base of the first cylinder, and the diameter of the circular base of the second cylinder are identical;

each second surface exactly covers the respective first surface;

the dimensions of the of the chamber measured along the second axis of revolution are greater than the dimensions of the intermediate member measured along the first axis of revolution, such that when the intermediate member is mounted in the chamber, the first surfaces and the second surfaces enable the intermediate member to move in translation relative to the outer body;

the ratio of the greatest dimension of the intermediate member measured along the first axis of revolution to the amplitude of the movement in translation of the intermediate member relative to the outer body lies in the range 5 to 20;

the ratio of the greatest dimension of the chamber measured along the second axis of revolution to the greatest dimension of the intermediate member measured along the first axis of revolution lies in the range 1.03 to 1.20;

the two first surfaces are connected together by two third surfaces, formed by portions of cylinders having circular bases of the same radius and axes of curvature that are separate, being parallel to the axis of the joint and intersecting the first axis of revolution; and the ratio of the greatest dimension of the intermediate member measured along the first axis of revolution and the width of each first surface measured along the first axis of revolution lies in the range 2.5 to 3.5, and is preferably equal to 3.1.

Furthermore, the present invention provides a method of assembling a mechanical joint assembly as defined above, in particular a swivel assembly, the method comprising the following steps:

introducing the intermediate member in the chamber by moving in translation along a central axis of the outer body;

causing the first axis of revolution to coincide with the second axis of revolution;

pivoting the intermediate member relative to the outer body about the first axis of revolution; and causing the first and second surfaces to co-operate.

By means of the invention, the intermediate member is retained in the retaining chamber, contact pressures are relatively low, ability to retain lubricant is large, and the overall size of the swivel assembly is limited, and it is relatively simple to assemble.

BRIEF DESCRIPTION OF THE DRAWINGS

The present invention can be well understood and its advantages appear further in the light of the following description given purely by way of non-limiting example and made with reference to the accompanying drawings, in which:

FIG. 1 is a cutaway perspective view of a mechanical joint assembly in accordance with the invention;

FIG. 2 is a section view of the FIG. 1 mechanical joint assembly on plane II of FIG. 1;

FIG. 3 is a section view of the FIG. 1 mechanical joint assembly on plane III of FIG. 1;

DESCRIPTION OF THE PREFERRED EMBODIMENT

Figure 4:
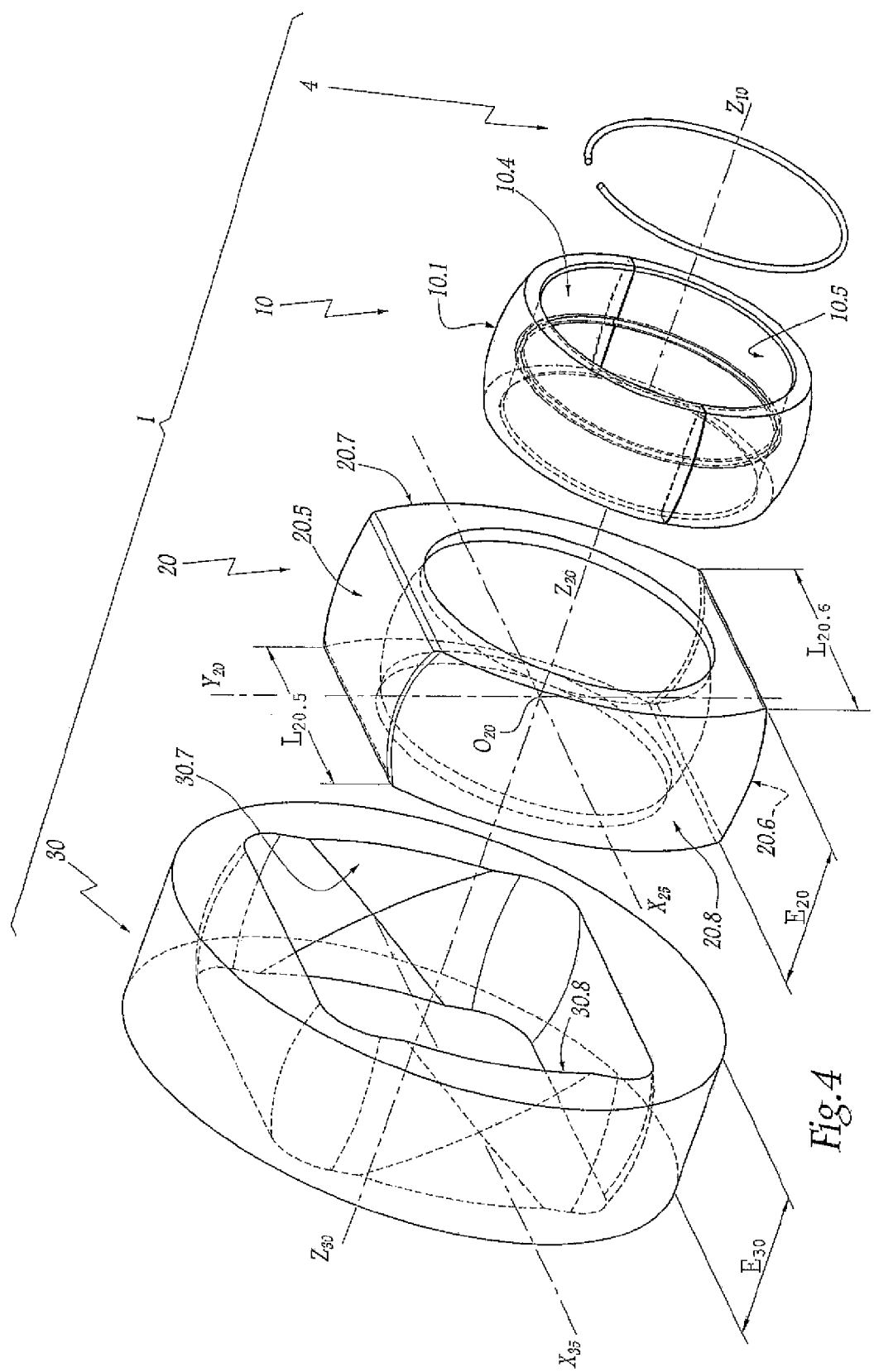
FIG. 4 is an exploded perspective of the FIG. 1 mechanical joint assembly.

FIG. 1 shows a swivel assembly 1 that forms a mechanical joint assembly. The swivel assembly 1 comprises a ball core 10, an insert 20, and a body 30. The core 10 forms an inner ring of the swivel assembly 1 and it provides a swivel connection about a swivel axis $Z_{10}$. The insert 20 forms an intermediate member of the swivel assembly 1. The body 30 defines an outer body of the swivel assembly 1. The core 10, the insert 20, and the body 30 are annular in shape, i.e. each of them presents a through orifice in its central region. The swivel assembly 1 has two plane and parallel faces 2 and 3. The core 10 has two plane and parallel faces 10.2 and 10.3. The insert 20 has two plane and parallel faces 20.2 and 20.3. The body 30 has two plane and parallel faces 30.2 and 30.3.

The swivel assembly 1 also includes a resilient ring 4 received in a groove 10.4 that is formed in the inside surface 10.5 of the core 10. The resilient ring 4 contributes to assembling a shaft (not shown) in the swivel assembly 1.

As shown in FIGS. 1 to 3, when the swivel assembly 1 is in the assembled state, the core 10 is received in the insert 20, which itself is held in the body 30. As shown in FIG. 4, the core 10 has a joint outside surface 10.1 that is in the form of a truncated sphere. The spherical envelope defining the joint outside surface 10.1 presents symmetry of revolution about the swivel axis $Z_{10}$. This spherical envelope is truncated by two geometrical planes that are parallel to each other and perpendicular to the swivel axis $Z_{10}$.

The insert 20 has a bearing inside surface 20.1 that is complementary in shape to the joint outside surface 10.1. The bearing inside surface 20.1 is thus in the form of a truncated sphere. The axis of revolution of the bearing inside surface 20.1 defines an axis $Z_{20}$ of the joint. Since the joint outside surface 10.1 and the bearing inside surface 20.1 are of complementary shape, the insert 20 can receive the core 10. The angular difference between the swivel axis $Z_{10}$ and the axis $Z_{20}$ of the joint corresponds to a swivel angle that varies when the core 10 turns in the housing formed by the insert 20. In the example of FIGS. 1 to 8, the swivel angle is zero since the swivel axis $Z_{10}$ and the axis $Z_{20}$ of the joint are colinear.

In the present application, the adjectives "inner" and "inside" designate an entity, e.g. a circuit, that is closer to or that faces towards the axis $Z_{20}$ of the joint. Conversely, the adjectives "outer" and "outside" qualify an entity, e.g. a surface, that is remote from or that faces away from the axis $Z_{20}$ of the joint.

As shown in FIG. 1, the body 30 defines a chamber 30.1 for retaining the insert 20. The chamber 30.1 extends around a central axis $Z_{30}$ of the body 30. The dimensions of the chamber 30.1 enable the insert 20 to move in translation perpendicularly to the axis $Z_{20}$ of the joint, as described in detail below.

Furthermore, the insert 20 defines two first surfaces 20.5 and 20.6 that are formed by convex cylinder portions. Specifically, the first peripherals 20.5 and 20.6 are two portions of a common first circular cylinder, such that they have a first axis $X_{25}$ as a common axis of revolution. As shown in FIG. 4, the first surfaces 20.5 and 20.6 occupy two opposite sides of the insert 20. More precisely, the first surfaces 20.5 and 20.6 are symmetrical about a center $O_{20}$ of the insert 20 that is situated at the intersection between the axis $Z_{20}$ of the joint and the first axis $X_{25}$.

In similar manner, the body 30 defines two second surfaces 30.5 and 30.6 that are in the form of concave cylinder portions. Specifically, the second surfaces 30.5 and 30.6 are portions of a common second circular cylinder, such that they have a second axis $X_{35}$ as their common axis of revolution. The second surfaces 30.5 and 30.6 extend over two opposite sides of the chamber 30.1. The second surfaces are symmetrical about the center of the chamber 30.1 (center not shown).

The diameter $D_{20}$ of the circular base of the first cylinder is substantially equal to the diameter $D_{30}$ of the circular base of the second cylinder. Specifically, the diameters $D_{20}$ and $D_{30}$ are identical. In other words, when the swivel assembly 1 is in the assembled state, each first surface 20.5 or 20.6 coincides substantially with a respective second surface 30.5 or 30.6. In the example of FIGS. 1 to 8, each second surface 30.5 or 30.6 exactly covers the respective first surface 20.5 or 20.6.

Thus, the first surfaces 20.5 and 20.6 co-operate with the second surfaces 30.5 and 30.6, thereby enabling the insert 20 to rotate relative to the body 30 about the first axis $X_{25}$, since the first axis $X_{25}$ coincides with the second axis $X_{35}$ when the swivel assembly 1 is in the assembled state. In other words, the insert 20 pivots in the chamber 30.1.

Each first surface 20.5 or 20.6 is configured to co-operate with a respective second surface 30.5 or 30.6 in such a manner that when the insert 20 is mounted in the chamber 30.1, the first surfaces 20.5 and 20.6 and the second surfaces 30.5 and 30.6 enable the insert 20 to rotate relative to the body 30, but prevent the insert 20 from moving in translation parallel to the axis $Z_{20}$ of the joint or parallel to an orthogonal axis $Y_{20}$ that is orthogonal to the axis $Z_{20}$ of the joint and to the second axis of revolution $X_{35}$.

The amplitude of this rotation is limited because of the overlap between the insert 20 and the body 30, i.e. because of the respective thickness $E_{20}$ and $E_{30}$ of the insert 20 and of the body 30 as measured along the axis $Z_{20}$ of the joint. In operation, a shaft not shown) is mounted in the swivel assembly 1. Such a shaft has little freedom of angular movement, thereby limiting rotation of the insert 20 within the body 30 and thus preventing the insert from escaping.

Furthermore, when the insert 20 is mounted in the chamber 30.1, co-operation between the first surfaces 20.5 and 20.6 with the second surfaces 30.5 and 30.6 prevents the insert 20 from moving in translation parallel to the axis $Z_{20}$ of the joint or parallel to an axis $Y_{20}$ that is orthogonal to the axis $Z_{20}$ of the joint and to the second axis $X_{35}$. In other words, when the first surfaces 20.5 and 20.6 co-operate respectively with the second surfaces 30.5 and 30.6, it is possible to transmit forces parallel to the axis $Y_{20}$.

The dimensions of the chamber 30.1 measured along the second axis $X_{35}$ are greater than the dimensions of the insert 20 measured along the first axis $X_{25}$. Thus, when the insert 20 is mounted in the chamber 30.1, the first surfaces 20.5 and 20.6 and the second surfaces 30.5 and 30.6 co-operate so as to allow the insert 20 to move in translation relative to the body 30. In other words, the insert 20 slides in the body 30 by the first surfaces 20.5 and 20.6 sliding on the second surfaces 30.5 and 30.6. In the embodiment shown in FIGS. 1 to 8, the ratio of the width $L_{35}$ of the chamber 30.1, i.e. its greatest dimension measured along the second axis $X_{35}$ to the width $L_{25}$ lies in the range 1.03 to 1.20. These widths $L_{25}$ and $L_{35}$ determine the amplitude with which the insert 20 can move in translation relative to the body 30, as mentioned above.

The ratio of the width $L_{25}$ of the insert 20, i.e. its greatest dimension measured along the first axis $X_{25}$ to the amplitude of the movement in translation of the insert 20 relative to the body 30 lies in the range 5 to 20. Such a ratio gives the insert 20 an acceptable degree of freedom.

As shown in FIG. 4, the two first surfaces 20.5 and 20.6 are connected together by third surfaces 20.7 and 20.8 that extend between opposite ends of the first surfaces 20.5 and 20.6. The third surfaces 20.7 and 20.8 are formed by portions of cylinders having circular bases of the same radius $R_{27}$ and of respective axes of curvature $Z_{20.7}$ and $Z_{20.8}$ that are separate, being parallel to the insert axis $Z_{20}$ and intersecting the first axis $X_{25}$ as shown in FIGS. 3 and 4.

A cross-section of the chamber 30.1 relative to the axis $Z_{20}$ of the joint is rectangular in shape having circularly rounded corners. In addition, the chamber 30.1 presents two lateral abutment surfaces 30.7 and 30.8 that are of cylindrical shape and complementary to the shapes of the third surfaces 20.7 and 20.8, respectively. While moving in translation parallel to the first axis $X_{25}$, the insert 20 comes into abutment against the lateral abutment surface 30.7 or 30.8.

Furthermore, the ratio of the greatest dimension $L_{25}$ of the insert 20 measured along the first axis $X_{25}$ divided by the width $L_{20.5}$ or $L_{20.6}$ measured along the first axis $X_{25}$ is equal to 3.1. In practice, this ratio lies in the range 2.5 to 3.5. Such a ratio makes it possible to avoid jamming when the insert 20 is moved in translation in the chamber 30.1.

FIGS. 5 to 8 show four steps in a method of assembling the swivel assembly 1.

Figure 5:
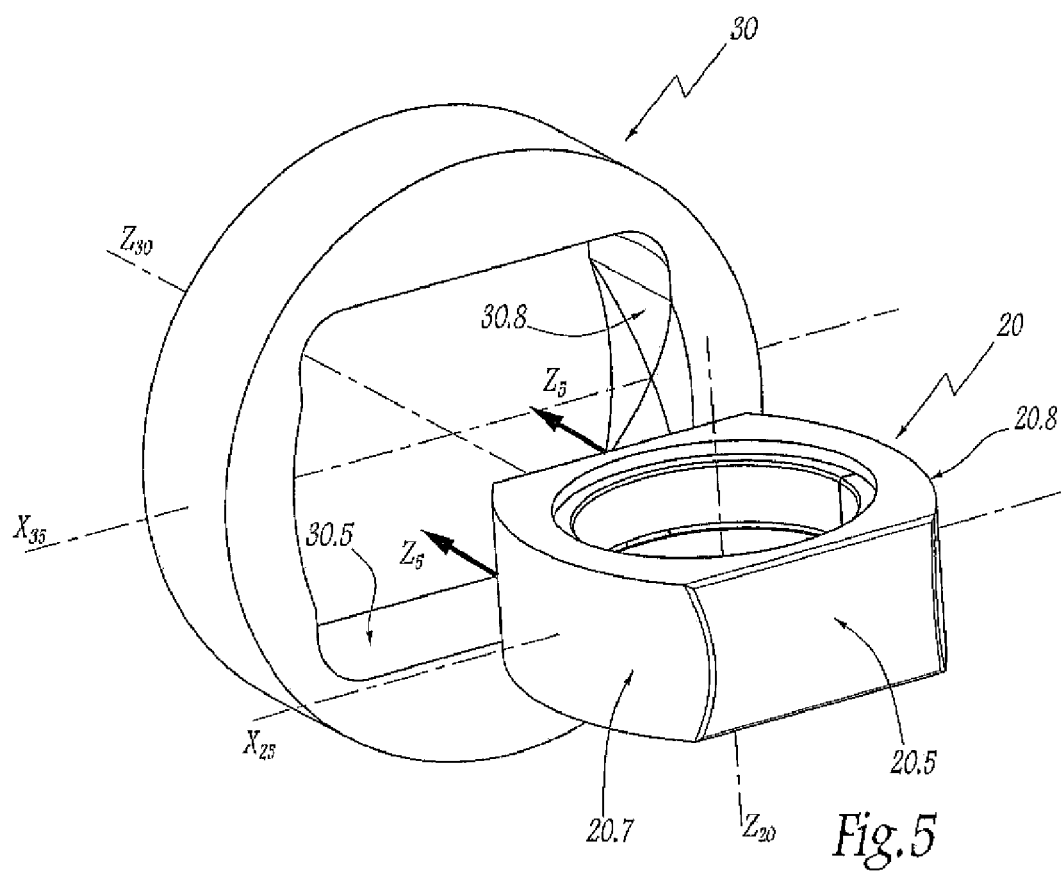
FIG. 5 is a perspective view seen from the same angle as FIG. 1 showing the FIG. 1 mechanical joint assembly in the disassembled state.

FIG. 5 shows a first step in which the insert 20 is introduced into the chamber 30.1 by moving in translation along the central axis $Z_{30}$, as represented by arrows $Z_5$. In order to be introduced into the body 30, the insert 20 is placed perpendicularly to the body 30, i.e. the axis $Z_{20}$ of the joint is perpendicular to the central axis $Z_{30}$. In addition, the first axis $X_{25}$ is placed parallel to the second axis $X_{35}$. In parallel, the swivel axis $Z_{10}$ may be made to coincide with the axis $Z_{20}$ of the joint.

Figure 6:
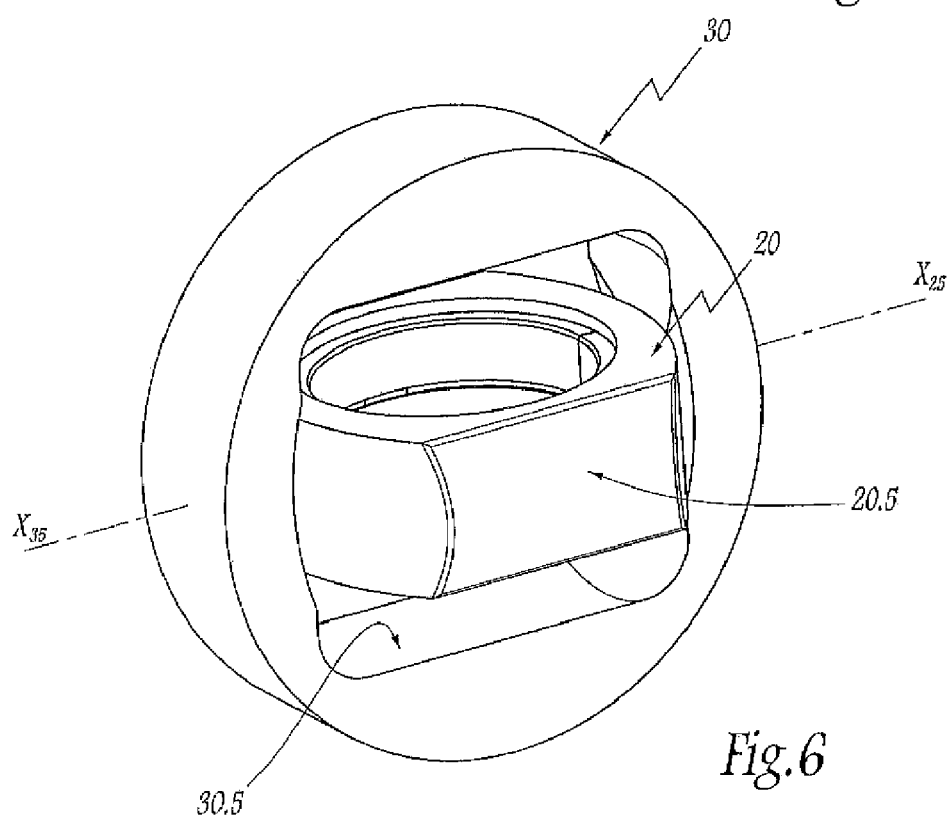
FIG. 6 is a view analogous to FIG. 5 showing the FIG. 1 mechanical joint assembly while it is being assembled.

In the second step shown in FIG. 6, movement in translation along arrows $Z_5$ is stopped when the first axis $X_{25}$ coincides with the second axis $X_{35}$.

Figure 7:
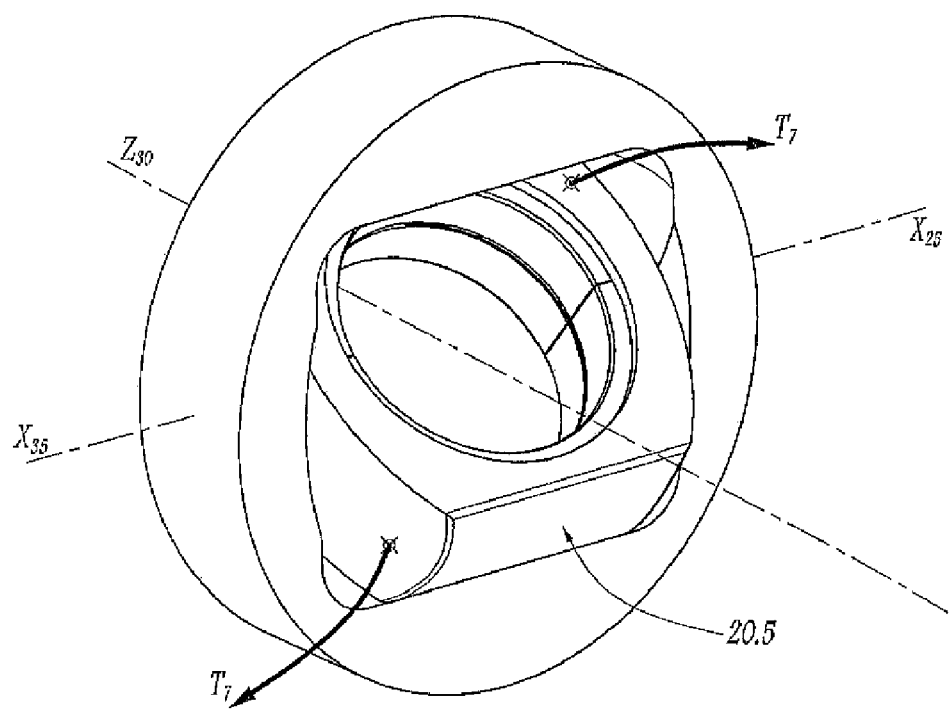
FIG. 7 is a view analogous to FIG. 5 of the FIG. 1 mechanical joint assembly during another stage of assembly.

In a third step shown in FIG. 7, the insert 20 is pivoted relative to the body 30 about the first axis $X_{20}$, as represented by arrows $T_7$. This third step terminates when the edges of the first surfaces 20.5 and 20.6 come into contact respectively with the edges of the second surfaces 30.5 and 30.6.

Figure 8:
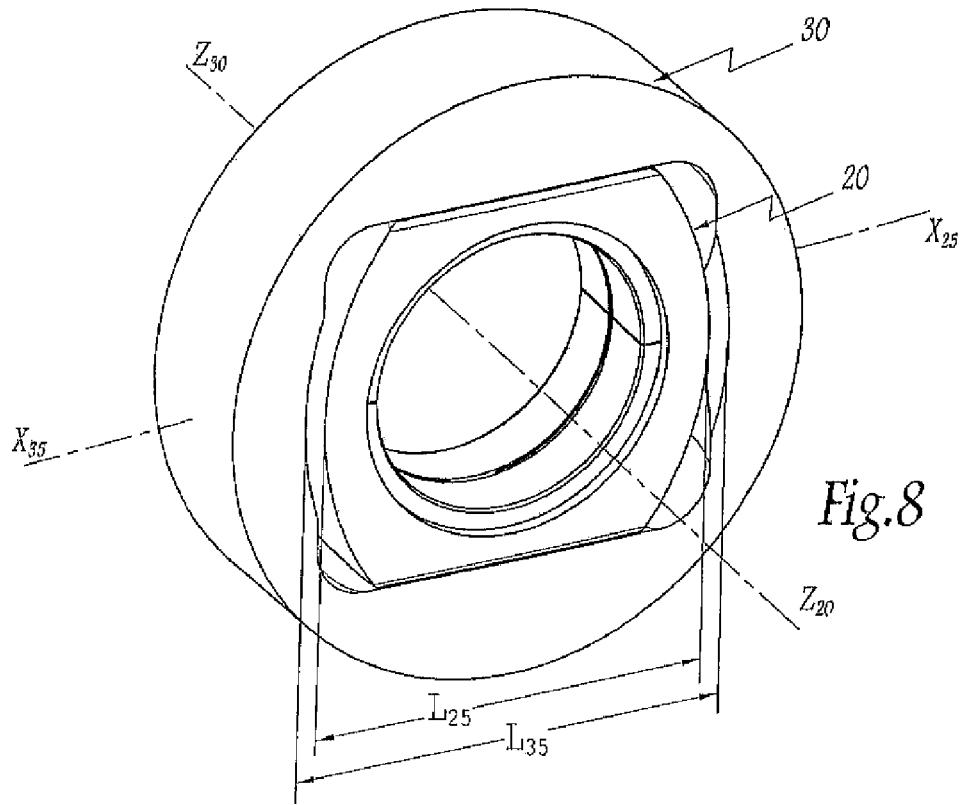
FIG. 8 is a view analogous to FIG. 5 showing the FIG. 1 mechanical joint assembly in the assembled state.

In a fourth step, shown in FIG. 8, the first surfaces 20.5 and 20.6 are made to co-operate with the second surfaces 30.5 and 30.6. To do this, the insert 20 is made to continue pivoting relative to the body 30 about the first axis $X_{25}$. This fourth step comes to an end when the first surfaces 20.5 and 20.6 overlie the second surfaces 30.5 and 30.6 to a maximum extent.

In a fourth step shown in FIG. 8, the swivel assembly 1 is in the assembled state, with the insert 20 retained in the chamber 30.1. The insert 20 is then free to move in translation relative to the body 30 through limited amplitude parallel to the second axis $X_{25}$. This movement in translation imparts a degree of freedom to a shaft (not shown) that is mounted in the swivel assembly 1. A mechanical joint assembly in accordance with the invention thus serves to improve the accommodation of contact between the body and the insert, in particular because it increases the extent of the contacting surfaces. Contact pressure or stress is thus reduced compared to a prior art mechanical joint assembly. Furthermore, a mechanical joint assembly in accordance with the invention does not require an additional part to keep the insert inside the body and to prevent it from moving along the central axis of the body. The mechanical joint assembly is thus compact and of little bulk. Furthermore, the shapes of the first surfaces improve the retention of lubricant, in particular liquid lubricant, thereby increasing the lifetime of the mechanical joint assembly.

The reduction in contact pressure comes firstly from the increase in the capacity for accommodating contact between the insert and the body, and secondly from the increase in the contact area between the insert and the body.

In a variant that is not shown, the faces of the swivel assembly and/or of one or the other of its components are not plane, but may for example be bulging.

The invention claimed is:

1. A mechanical joint assembly, comprising:
   an inner ring having an outer joint surface substantially in the shape of a truncated sphere;
   an intermediate member having a bearing inside surface that is substantially in the shape of a truncated sphere and complementary to the outer joint surface so as to receive the inner ring, an axis of revolution of the bearing inside surface defining a joint axis of the joint; and
   an outer body defining a chamber for retaining the intermediate member;
   wherein the intermediate member defines two first surfaces formed by cylindrical portions, the two first surfaces having a common first axis of revolution which intersects the joint axis;
   wherein the outer body defines two second surfaces formed by cylindrical portions, the two second surfaces having a common second axis of revolution;

wherein each first surface is configured to cooperate respectively with one of the second surfaces in such a manner that when the intermediate member is mounted in the chamber, the first axis of revolution coincides with the second axis of revolution and the first surfaces and the second surfaces enable the intermediate member to rotate relative to the outer body about the first axis of revolution but prevent the intermediate member from moving parallel to the joint axis or parallel to an axis orthogonal to the joint axis and to the second axis of revolution; and wherein the two first surfaces are connected together by two third surfaces, formed by portions of cylinders having circular bases of the same radius and axes of curvature that are separate, being parallel to the joint axis and intersecting the first axis of revolution.

2. The assembly according to claim 1, wherein the two first surfaces are symmetrical about a center of the intermediate member which is situated at the intersection between the joint axis and the first axis of revolution.

3. The assembly according to claim 1, wherein the two first surfaces are formed by portions of a common first circular cylinder, and wherein the two second surfaces are formed by portions of a common second circular cylinder, a diameter of a circular base of the first circular cylinder being substantially equal to a diameter of a circular base of the second circular cylinder.

4. The assembly according to claim 3, wherein the diameter of the circular base of the first circular cylinder, and the diameter of the circular base of the second circular cylinder are identical.

5. An assembly according to claim 3, wherein each second surface exactly covers a respective and facing first surface.

6. The assembly according to claim 1, wherein dimensions of the chamber measured along the second axis of revolution are greater than dimensions of the intermediate member measured along the first axis of revolution, such that when the intermediate member is mounted in the chamber, the two first surfaces and the two second surfaces enable the intermediate member to move in translation along the first axis of revolution relative to the outer body.

7. The assembly according to claim 6, wherein a ratio of the greatest dimension of the intermediate member measured along the first axis of revolution to an amplitude of movement in translation of the intermediate member relative to the outer body is in a range 5 to 20.

8. The assembly according to claim 7, wherein a ratio of the greatest dimension of the chamber measured along the second axis of revolution to the greatest dimension of the intermediate member measured along the first axis of revolution is in a range 1.03 to 1.20.

9. The assembly according to claim 1, wherein a ratio of a greatest dimension of the intermediate member measured along the first axis of revolution and a width of each first surface measured along the first axis of revolution is in a range 2.5 to 3.5.

10. A mechanical joint assembly, comprising:

an inner ring having an outer joint surface substantially in the shape of a truncated sphere;

an intermediate member having a bearing inside surface that is substantially in the shape of a truncated sphere and complementary to the outer joint surface so as to receive the inner ring, an axis of revolution of the bearing inside surface defining a joint axis of the joint; and an outer body defining a chamber for retaining the intermediate member;

wherein the intermediate member defines two first surfaces formed by cylindrical portions, the two first surfaces having a common first axis of revolution which intersects the joint axis;

wherein the outer body defines two second surfaces formed by cylindrical portions, the two second surfaces having a common second axis of revolution;

wherein each first surface is configured to cooperate respectively with one of the second surfaces in such a manner that when the intermediate member is mounted in the chamber, the first axis of revolution coincides with the second axis of revolution and the first surfaces and the second surfaces enable the intermediate member to rotate relative to the outer body about the first axis of revolution but prevent the intermediate member from moving parallel to the joint axis or parallel to an axis orthogonal to the joint axis and to the second axis of revolution; and wherein dimensions of the chamber measured along the second axis of revolution are greater than dimensions of the intermediate member measured along the first axis of revolution, such that when the intermediate member is mounted in the chamber, the two first surfaces and the two second surfaces enable the intermediate member to move in translation along the first axis of revolution relative to the outer body.

11. The assembly according to claim 10, wherein the two first surfaces are symmetrical about a center of the intermediate member which is situated at the intersection between the joint axis and the first axis of revolution.

12. The assembly according to claim 10, wherein the two first surfaces are formed by portions of a common first circular cylinder, and wherein the two second surfaces are formed by portions of a common second circular cylinder, a diameter of a circular base of the first circular cylinder being substantially equal to a diameter of a circular base of the second circular cylinder.

13. The assembly according to claim 12, wherein the diameter of the circular base of the first circular cylinder, and the diameter of the circular base of the second circular cylinder are identical.

14. The assembly according to claim 12, wherein each second surface exactly covers a respective and facing first surface.

15. The assembly according to claim 10, wherein a ratio of the greatest dimension of the intermediate member measured along the first axis of revolution to an amplitude of movement in translation of the intermediate member relative to the outer body is in a range 5 to 20.

16. The assembly according to claim 15, wherein a ratio of the greatest dimension of the chamber measured along the second axis of revolution to the greatest dimension of the intermediate member measured along the first axis of revolution is in a range 1.03 to 1.20.

17. The assembly according to claim 10, wherein a ratio of a greatest dimension of the intermediate member measured along the first axis of revolution and a width of each first surface measured along the first axis of revolution is in a range 2.5 to 3.5.

* * * * *

UNITED STATES PATENT AND TRADEMARK OFFICE
CERTIFICATE OF CORRECTION

| | | |
|---|---|---|
| PATENT NO. | : 8,337,087 B2 | Page 1 of 1 |
| APPLICATION NO. | : 12/813802 | |
| DATED | : December 25, 2012 | |
| INVENTOR(S) | : Blachon et al. | |

It is certified that error appears in the above-identified patent and that said Letters Patent is hereby corrected as shown below:

On the Title Page, Item [73]:

The name of assignee of the referenced patent should be corrected to include "France" and should appear as follows: SKF AREOSPACE FRANCE as is recorded at reel 029415, frame 0888.

Signed and Sealed this
Thirtieth Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,337,087 B2
APPLICATION NO. : 12/813802
DATED : December 25, 2012
INVENTOR(S) : Yvan Blachon It is certified that error appears in the above-identified patent and that said Letters Patent is hereby corrected as shown below:

On the Title Page, Item [73], Assignee:

"SFK AEROSPACE" should read as follows: SFK AEROSPACE FRANCE

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,337,087 B2  Page 1 of 1
APPLICATION NO. : 12/813802
DATED : December 25, 2012
INVENTOR(S) : Yvan Blachon It is certified that error appears in the above-identified patent and that said Letters Patent is hereby corrected as shown below:

On the Title Page, Item [73], Assignee:

"SKF AEROSPACE" should read as follows: SKF AEROSPACE FRANCE

This certificate supersedes the Certificate of Correction issued April 1, 2014.

Signed and Sealed this
Ninth Day of September, 2014

Michelle K. Lee
*Deputy Director of the United States Patent and Trademark Office*